US012384356B2

(12) United States Patent
Christen et al.

(10) Patent No.: US 12,384,356 B2
(45) Date of Patent: Aug. 12, 2025

(54) ELECTRIFIED VEHICLE CONTROL DURING TRAILER TOWING

(71) Applicant: FORD GLOBAL TECHNOLOGIES, LLC, Dearborn, MI (US)

(72) Inventors: Erik J. Christen, Royal Oak, MI (US); Gregory Kucab, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 126 days.

(21) Appl. No.: 17/493,495

(22) Filed: Oct. 4, 2021

(65) Prior Publication Data
US 2023/0104277 A1    Apr. 6, 2023

(51) Int. Cl.
*B60W 20/13* (2016.01)
*B60D 1/62* (2006.01)
*B60W 50/14* (2020.01)

(52) U.S. Cl.
CPC ............ *B60W 20/13* (2016.01); *B60W 50/14* (2013.01); *B60D 1/62* (2013.01); *B60W 2420/403* (2013.01); *B60W 2510/244* (2013.01); *B60W 2520/105* (2013.01); *B60W 2520/125* (2013.01); *B60W 2530/203* (2020.02); *B60W 2540/215* (2020.02)

(58) Field of Classification Search
CPC .................. B60W 20/13; B60W 2530/203
See application file for complete search history.

(56) References Cited

U.S. PATENT DOCUMENTS

| | | | |
|---|---|---|---|
| 10,384,667 B2 | 8/2019 | Frank et al. | |
| 10,773,602 B2 | 9/2020 | Caliskan et al. | |
| 2015/0291145 A1* | 10/2015 | Yu | B60W 20/13 180/65.23 |
| 2017/0001581 A1* | 1/2017 | Rinker | F02D 41/021 |
| 2019/0225154 A1* | 7/2019 | Ionascu | G06F 18/256 |
| 2021/0086628 A1 | 3/2021 | Kava et al. | |
| 2022/0041156 A1* | 2/2022 | Imamura | B60K 6/445 |

* cited by examiner

*Primary Examiner* — Imran K Mustafa
(74) *Attorney, Agent, or Firm* — David B. Kelley; Brooks Kushman PC (57) ABSTRACT

A system and method for a vehicle having a traction battery, an electric machine, and a secondary power source, such as an engine, operate the electric machine and secondary power source to sustain a state of charge (SOC) of the traction battery when the SOC is either: a) below a first threshold and above a second threshold; or b) below a third threshold; and to deplete the SOC of the traction battery when the SOC is between the second and the third thresholds in response to detecting an operating condition associated with high Amp-hour (Ah) throughput of the traction battery, such as towing a trailer. The system and method operate the electric machine and the secondary power source to deplete the SOC when the SOC is above the third threshold and sustain the SOC when the SOC is below the third threshold when the condition is not detected.

20 Claims, 4 Drawing Sheets

ELECTRIFIED VEHICLE CONTROL DURING TRAILER TOWING

TECHNICAL FIELD

This disclosure relates to control of an electrified vehicle while towing a trailer.

BACKGROUND

As more and more vehicles are electrified, high voltage (HV) battery packs are increasing in capacity and number of battery cells to provide expected travel range and vehicle performance. An HV battery pack may include a controller, such as a battery electrical control module (BECM), several cell monitor and management (CMM) modules, and various other controllers and electronics to monitor and control charging and operation of individual battery cells that are connected together to provide the HV battery pack output voltage and current. Various conditions during charging and operation may impact HV battery pack performance and health. One metric used to monitor or measure the impact of battery utilization on battery health is Amp-hour (Ah) throughput. Higher Ah throughput associated with extended use in unfavorable operating conditions or high-demand applications such as towing a trailer may be associated with more rapid deterioration of the battery State of Health (SoH).

SUMMARY

Embodiments of the disclosure include an electrified vehicle comprising a traction battery, an electric machine powered by the traction battery to selectively provide propulsion to the vehicle, an engine coupled to the electric machine, and a controller programmed to, in response to detecting a trailer connected to the electrified vehicle, operate the electric machine and the engine to sustain a state of charge (SOC) of the traction battery when the SOC is either between a first threshold and a second threshold, or below a third threshold, and operate the electric machine and the engine to deplete the SOC when the SOC is either above the first threshold or between the second threshold and the third threshold. The first threshold is higher than the second threshold and the second threshold is higher than the third threshold. In one embodiment, the first threshold corresponds to 70% SOC and the second threshold corresponds to 30% SOC.

The electrified vehicle may include at least one sensor mounted on the vehicle and configured to provide a signal to the controller to detect the trailer. The at least one sensor may include a camera. The controller may be programmed to detect the trailer when a trailer electrical circuit configured to power trailer lights is connected to a corresponding electrical circuit of the electrified vehicle. The controller may be programmed to detect the trailer by comparing a measured vehicle acceleration to an expected vehicle acceleration associated with a driver demand torque. The electrified vehicle may include a human-machine interface (HMI), wherein the controller is programmed to detect the trailer in response to input received by the HMI and communicated to the controller.

Embodiments may also include a method for controlling an electrified vehicle having a traction battery coupled to an electric machine to selectively provide propulsive torque to the vehicle, and a secondary power source configured to supply power to at least one of the electric machine and the traction battery. The method includes, by a vehicle controller, controlling the electric machine and the secondary power source to sustain a state of charge (SOC) of the traction battery when the SOC is either below a first threshold and above a second threshold or below a third threshold in response to detecting an operating condition associated with traction battery amp-hour throughput exceeding an associated throughput threshold; and controlling the electric machine and the secondary power source to deplete the SOC of the traction battery when the SOC is above the third threshold, and to sustain the SOC when the SOC is below the third threshold when the operating condition is not detected. The method may also include controlling the electric machine and the secondary power source to deplete the SOC of the traction battery when the SOC is either above the first threshold, or below the second threshold and above the third threshold in response to detecting the operating condition.

The secondary power source may include an internal combustion engine. The operating condition may include towing a trailer. The operating condition may be detected in response to receiving input from a human-machine interface (HMI) of the electrified vehicle, and/or detecting the completion of an electrical circuit between the trailer and the electrified vehicle. Detection of the operating condition may be based on comparing measured acceleration of the electrified vehicle for a specified torque request to an associated expected acceleration.

Various embodiments may include a system for an electrified vehicle having an electric machine powered by a traction battery and an engine that includes a controller programmed to, in response to detecting an operating condition associated with traction battery amp-hour throughput exceeding an associated throughput threshold: sustain a state of charge (SOC) of the traction battery when the SOC is either: a) below a first threshold and above a second threshold; or b) below a third threshold; and deplete the SOC of the traction battery when the SOC is between the second and the third thresholds. The controller may be further programmed to detect the operating condition in response to detecting a trailer coupled to the electrified vehicle. The controller may be further programmed to, in response to not detecting the operating condition: control vehicle operation to deplete the SOC when the SOC is above the third threshold; and to sustain the SOC when the SOC is below the third threshold. The controller may be further programmed to detect the operating condition based on input from a human-machine interface (HMI) of the electrified vehicle. The controller may be further programmed to detect the operating condition based on an electrical connection between the trailer and the electrified vehicle.

Embodiments of the disclosure may provide one or more associated advantages. For example, inserting a charge sustaining zone within a typical charge depletion zone when towing a trailer or under other high demand conditions associated with high Ah throughput reduces the Ah throughput over the lifetime of the vehicle and mitigates the impact of high throughput on HV battery SoH. For many existing vehicles, the control strategy may be implemented via a software update to leverage existing vehicle hardware to provide a relatively low cost implementation. This solution may be customer selectable via the HMI and may improve customer satisfaction and vehicle residual value by maintaining battery SoH.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The present inventors have recognized that particular use scenarios of an electrified vehicle may adversely affect the HV battery SoH. For example, an electrified vehicle towing a trailer for a significant portion of its trips may experience more rapid HV battery degradation relative to a vehicle that has a lower percentage of trips with conditions that quickly discharge the HV battery. Furthermore, that Ah throughput of the HV battery is one metric that may be used to monitor or evaluate the HV battery SoH. As such, reducing Ah throughput of the HV battery over the lifetime of the vehicle, specifically during trailing towing events, may improve HV battery performance and durability over the lifetime of the vehicle. As such, various embodiments according to the disclosure identify events that may otherwise result in higher impact to the HV battery SoH and control the vehicle to reduce or eliminate the impact. In one or more embodiments, the electrified vehicle is controlled to operating within a battery health zone having upper and lower battery SOC thresholds for operating in a charge sustaining mode, which reduces operation in a charge depletion mode during a detected use scenario, such as trailer towing. Under these use scenarios, a vehicle starting a trip with the HV battery SOC above the health zone will operate in charge depletion mode until the SOC crosses into the health zone, and then operate in charge sustaining mode. A vehicle starting a trip with the HV battery SOC within the health zone will operate in charge sustaining mode. A vehicle starting a trip with the HV battery SOC below the lower threshold of the health zone will operate the same as when the use scenario has not been detected, according to normal mode charge depletion and charge sustaining SOC thresholds. Stated differently, the control strategy inserts a charge sustaining battery health zone for trailer towing in the middle of the normal charge depletion zone, resulting in two charge depletion zones and two charge sustaining zones as compared to normal operation with only one charge depletion zone and one charge sustaining zone.

Figure 1:
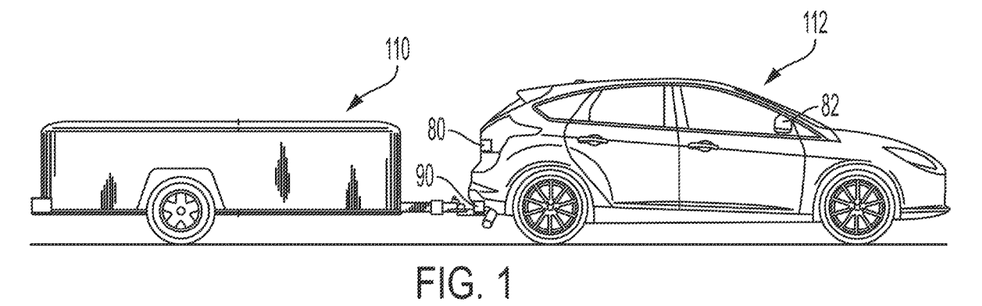
FIG. 1 illustrates an example of an electrified vehicle in a high demand use scenario such as towing a trailer and having a control strategy to mitigate the effect on HV battery SoH.
Figure 2:
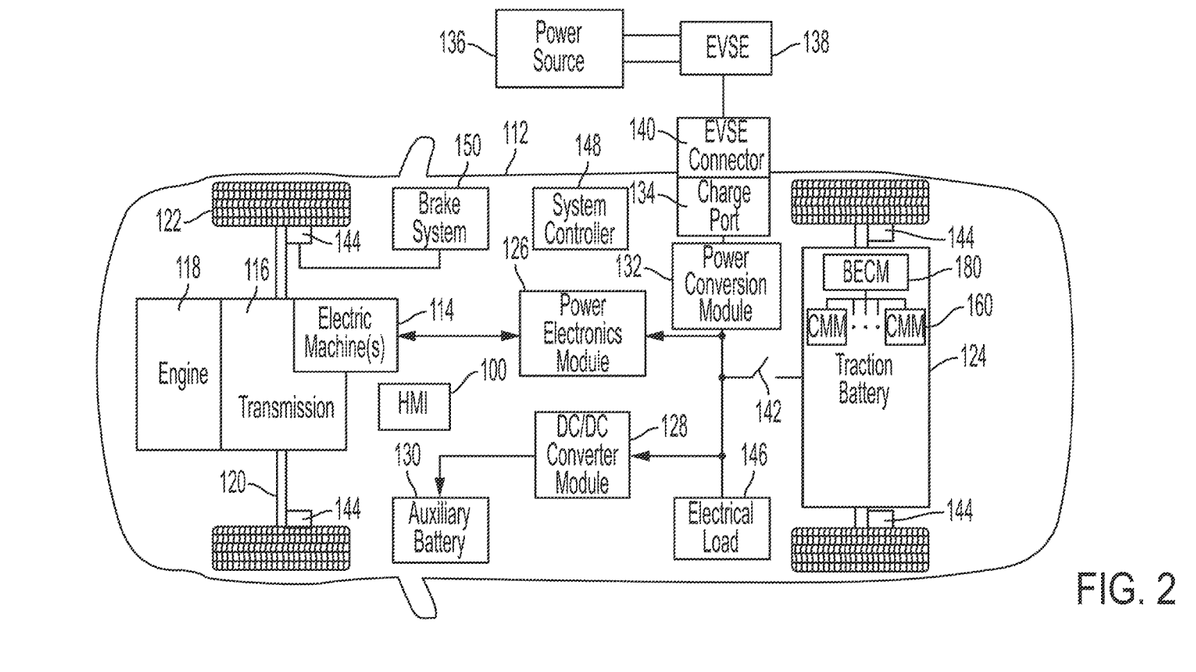
FIG. 2 is a block diagram illustrating a representative electrified vehicle implemented as a plug-in hybrid electric vehicle (PHEV) having a controller to control powertrain operation during trailer towing or other high demand use scenarios according to one or more embodiments.

FIG. 1 illustrates an electrified vehicle 112 towing a trailer 110. Trailer towing is a representative high demand use scenario that may initiate an HV battery SoH protection or mitigation control strategy according to this disclosure. Vehicle 112 may have more than one control mode or strategy to reduce or eliminate the impact of high Ah throughput on long term battery SoH with the particular strategy selected based on satisfying the corresponding entrance conditions. As such, those of ordinary skill in the art will recognize that any embodiments described with respect to a trailer towing scenario can similarly be applied to other high demand use scenarios, which may have different upper and lower battery health zone thresholds, different entry conditions, etc. Vehicle 112 may detect towing of a trailer 110 based on one or more inputs from a vehicle operator and various sensors. For example, an operator may select a tow/haul mode using a physical switch or other input via a human-machine interface (HMI) 100 (FIG. 2). Vehicle 112 may include one or more cameras, such as a rear view or backup camera 80 and side view camera 82 integrated with the side view mirror(s) with associated image processing to detect trailer 110. Other sensors, such as a trailer hitch sensor 90, electronic suspension sensor (not shown), trailer electrical connection, etc. may also be used. The vehicle system controller 148 (FIG. 2) may also include one or more algorithms to detect trailer 110 based on grade, torque request, known vehicle properties such as weight, acceleration, drag, etc.

FIG. 2 depicts a representative embodiment of an electrified vehicle with at least one controller to control the vehicle during trailer towing or other high demand use scenarios according to the disclosure. In the representative vehicle embodiment of FIG. 2, vehicle 112 is an electrified vehicle, such as a plug-in hybrid electric vehicle (HEV) in this example, but may also be a fully electrified battery electric vehicle (BEV) or other type of vehicle depending on the particular implementation. As explained in greater detail below, various types of electrified vehicles may include more than one power source such that a HV battery may be operated in either charge depletion or charge sustaining mode or to switch to an alternative power source to maintain the battery SOC within a predetermined health zone for a particular high demand use scenario. Vehicle 112 may comprise one or more electric machines 114 mechanically connected to a transmission 116. The electric machines 114 may be capable of operating as a motor or a generator. In addition, the transmission 116 is mechanically connected to an internal combustion engine 118. The transmission 116 is also mechanically connected to a drive shaft 20 that is mechanically connected to the wheels 122. The electric machines 114 can provide propulsion and regenerative braking capability when the engine 118 is turned on or off. During regenerative braking, the electric machines 114 act as generators and can provide fuel economy benefits by recovering energy that would normally be lost as heat in the friction braking system. The electric machines 114 may also reduce vehicle emissions by allowing the engine 118 to operate at more efficient speeds and allowing the hybrid-electric vehicle 112 to be operated in electric mode with the engine 118 off under certain conditions.

An HV traction battery or battery pack 124 stores energy that can be used by the electric machines 114 in a plurality of low voltage cells connected in groups or strings to provide a desired energy storage capacity and output voltage/current. Vehicle 112 may include more than one battery pack that may be used simultaneously or in sequence. For example, vehicle 112 may include a second battery pack (not shown) that provides an emergency reserve to extend the electric range, power external equipment, and/or to provide additional acceleration for applications such as trailer towing.

Vehicle battery pack 124 typically provides a high voltage DC output. Each group or string of cells may have an associated cell monitoring module (CMM) 160 that measures voltages for individual battery cells or groups of cells and controls various battery functions, such as cell balancing, for example. Each CMM 160 may communicate with a battery controller, sometimes referred to as a battery energy control module (BECM) 180. The BECM may communicate with one or more other vehicle controllers such as vehicle system controller 148 over a wired or wireless vehicle network to provide higher-level control functions of the traction battery 124 as described herein.

The traction battery 124 is electrically connected to one or more power electronics modules. One or more contactors 142 may isolate the traction battery 124 from other components when opened and connect the traction battery 124 to other components when closed. A power electronics module 126 is also electrically connected to the electric machines 114 and provides the ability to bi-directionally transfer energy between the traction battery 124 and the electric machines 114. For example, a typical traction battery 124 may provide a DC voltage while the electric machines 114 may require a three-phase AC current to function. The power electronics module 126 may convert the DC voltage to a three-phase AC current as required by the electric machines 114. In a regenerative mode, the power electronics module 126 may convert the three-phase AC current from the electric machines 114 acting as generators to the DC voltage required by the traction battery 124. The description herein is equally applicable to an electrified vehicle implemented as a pure electric vehicle, often referred to as a battery electric vehicle (BEV). For a BEV, the hybrid transmission 116 may be a gear box connected to an electric machine 114 and the engine 118 may be omitted.

In addition to providing energy for propulsion during a charge depletion mode, the traction battery 124 may provide energy for other vehicle electrical systems. A typical system may include a DC/DC converter module 128 that converts the high voltage DC output of the traction battery 124 to a low voltage DC supply that is compatible with other vehicle loads. Other high-voltage loads, such as compressors and electric heaters, may be connected directly to the high-voltage without the use of a DC/DC converter module 128. The low-voltage systems may be electrically connected to an auxiliary battery 130 (e.g., 12V, 24V, or 48V battery).

The electrified vehicle 112 may be a BEV or a plug-in hybrid vehicle in which the traction battery 124 may be recharged by an external power source 136, or a standard hybrid that charges traction battery 124 from operating electric machines as a generator during a charge sustaining mode but does not receive power from an external power source. The external power source 136 may be a connection to an electrical outlet. The external power source 136 may be electrically connected to electric vehicle supply equipment (EVSE) 138. The EVSE 138 may provide circuitry and controls to regulate and manage the transfer of energy between the power source 136 and the vehicle 112. In other embodiments, the vehicle 112 may employ wireless charging, which may be referred to as hands-free or contactless charging that uses inductive or similar wireless power transfer.

The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically connected to an on-board power conversion module 132 having an associated battery charger controller. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically connected may transfer power using a wireless inductive coupling as previously described.

One or more wheel brakes 144 may be provided for friction braking of the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components that are required to operate the wheel brakes 144. For simplicity, the figure depicts a single connection between the brake system 150 and one of the wheel brakes 144. A connection between the brake system 150 and the other wheel brakes 144 is implied.

One or more electrical loads 146 may be connected to the high-voltage bus. The electrical loads 146 may have an associated controller that operates the electrical load 146 when appropriate. Examples of electrical loads 146 may be a heating module or an air-conditioning module.

The various components described may have one or more associated controllers to control and monitor the operation of the components. It should be understood that any one of the representative controllers can collectively be referred to as a "controller" that controls various actuators in response to signals from various sensors to control the vehicle. The controllers may communicate via a vehicle network that may be implemented as a serial bus (e.g., Controller Area Network (CAN)) or via discrete conductors. In addition, system controller 148 may be present to coordinate the operation of the various components and may communicate directly or indirectly with one or more other vehicle controllers, such as BECM 180, a body controller or control module, and a battery charger controller or control module. HMI 100 may communicate with system controller 148 to receive input from a vehicle operator and provide visual, audio, and/or haptic output to vehicle occupants. HMI 100 may also provide coordination of various vehicle telematics and infotainment system functions any may communicate via a modem with external services via a cellular or satellite modem, for example. HMI 100 may prompt for input to confirm trailer towing mode or other high demand mode operation. In some applications HMI 100 may allow customization of various entry conditions or operational limits for a battery health zone to allow users to adjust vehicle performance for a particular trip or time period within limits set by the system.

Each controller, such as vehicle system controller 148, may include a microprocessor or central processing unit (CPU) in communication with various types of memory or non-transitory computer readable storage devices or media. Computer readable storage devices or media may include volatile and nonvolatile or persistent storage in read-only memory (ROM), random-access memory (RAM), and keep-alive memory (KAM), for example. KAM is a persistent or non-volatile memory that may be used to store various operating variables while the processor is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, solid state, or combination memory devices capable of storing data, some of which represent executable instructions, used by the controller to implement various algorithms or control strategies to control the vehicle 112 via various vehicle components or subsystems.

Control logic, functions, code, software, strategy etc. performed by one or more processors or controllers may be represented by block diagrams or flow charts (as in FIG. 6, for example), or similar diagrams in one or more figures (as in FIGS. 1-5, for example). These figures provide representative control strategies, algorithms, and/or logic for operation of a system or method according to the disclosure that may be implemented using one or more processing strategies such as event-driven, interrupt-driven, multi-tasking, multi-threading, and the like. As such, various steps or functions illustrated or described may be performed in the sequence as illustrated or described, in parallel, or in some cases omitted. Although not always explicitly illustrated or described, one of ordinary skill in the art will recognize that one or more of the steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as system controller 148. Of course, the control logic may be implemented in software, hardware, or a combination of software and hardware in one or more controllers depending upon the particular application. When implemented in software, the control logic may be provided in one or more non-transitory computer-readable storage devices or media having stored data representing code or instructions executed by a computer to control the vehicle or its subsystems as previously described.

Figure 3:
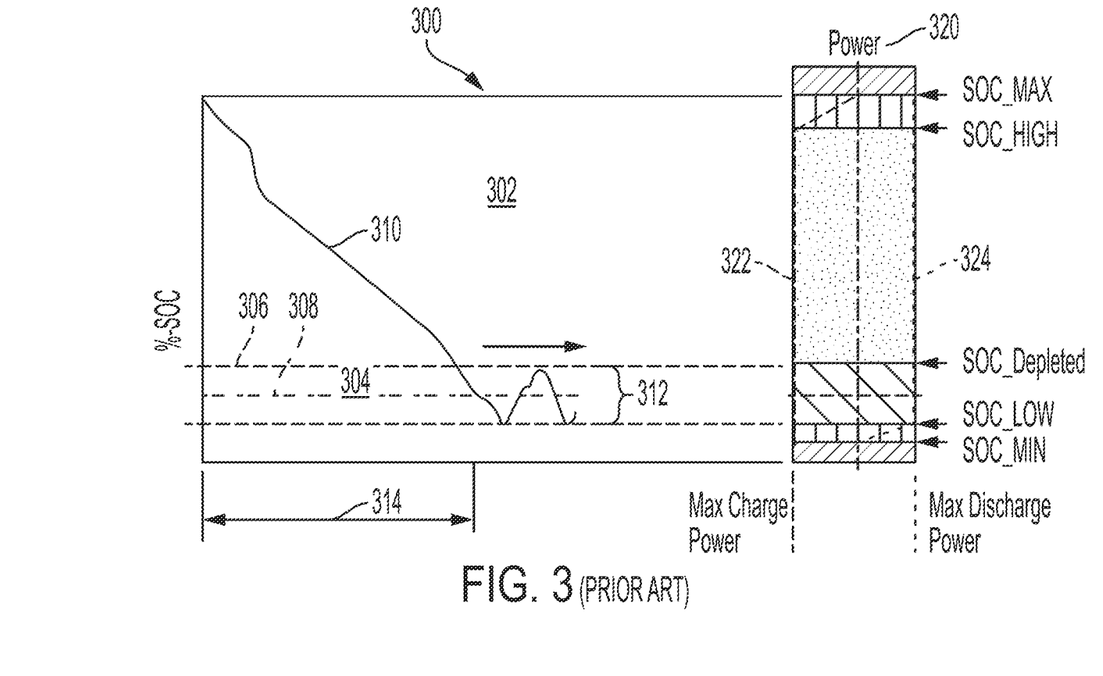
FIG. 3 is a graphical representation of electrified vehicle operation according to a prior art control strategy.

FIG. 3 is a graphical representation 300 of electrified vehicle operation according to a prior art control strategy illustrating HV battery % SOC as a function of time over representative driving cycles, which may include city and/or highway driving. The control strategy illustrated includes a charge depletion zone 302 and a charge sustaining (CS) zone 304 defined by an associated threshold 306, which may be 17% SOC, for example. During operation beginning with a complete charge indicated by SOC_MAX, the vehicle is operated in a charge depleting (CD) zone or mode 302 and the measured or estimated SOC 310 continues to decrease at different rates over various charge depleting cycles 314, which may include city and/or highway cycles, depending on the torque demand of the electric machine. When SOC crosses threshold 306, the control strategy switches to a charge sustaining mode or zone 304 with the electric machine and engine operated to maintain a target SOC 308 within the charge sustaining zone 304. While in this mode, the SOC may increase and decrease around the target value to provide useable electric power to the electric machine as indicated at 312 to keep the SOC above the SOC_LOW threshold.

As also illustrated in the graphical representation 300, battery power 320 may be limited between a maximum charging power 322 and a maximum discharging power 324. The maximum charging power increases from zero at SOC_MAX to its limit at SOC_HIGH. The maximum discharging power ranges from zero at SOC_MIN to its limit at SOC_LOW. As illustrated by the power axis 320, battery operation includes some charge capacity above SOC_MAX and below SOC_MIN but is limited by the controller to provide sufficient operational margins and avoid damage to the battery by overcharging or over discharging.

Figure 4:
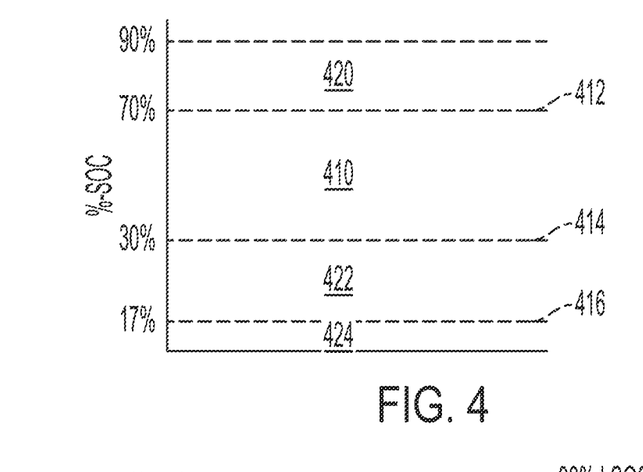
FIG. 4 illustrates operating zones for a representative electrified vehicle with a battery health zone to reduce Ah throughput of the HV battery while towing a trailer.

FIG. 4 illustrates operating zones or modes for a representative electrified vehicle with a battery health mode or zone 410 with a control strategy to reduce Ah throughput of the HV battery while towing a trailer or operating under similar high-demand scenarios. Health zone 410 is defined by a first SOC threshold 412 and a second SOC threshold 414. After detecting a trailer coupled to the electrified vehicle, the controller operates the electric machine and secondary power source, such as an internal combustion engine, in charge sustaining mode to maintain a target SOC while the battery SOC is within the Health zone 410, i.e. when the SOC is between the first threshold 412 and second threshold 414. The controller also operates the powertrain in charge sustaining mode when the SOC falls below a third threshold 416, which corresponds to the normal CS operation threshold when not towing a trailer. As illustrated, the first threshold 412 is higher than the second threshold 414, which in turn is higher than the third threshold 416. In one embodiment, the health zone is defined by a first threshold 412 at 70% SOC and a second threshold 414 at 30% SOC. The third threshold 416 for normal CS mode is at 17% SOC. However, the programmable thresholds may vary depending on the particular application and implementation.

As illustrated in FIG. 4, health zone 410 effectively creates alternating charge depletion and charge sustaining modes or zones including a first charge depletion zone 420 above the first threshold 412, a first charge sustaining zone 410 between the first threshold 412 and the second threshold 414, a second charge depletion zone 422 between the second threshold 414 and the third threshold 416, and a second charge sustaining zone 424 below the third threshold 416. As such, the control strategy according to various embodiments of the disclosure includes two charge sustaining zones and two charge depletion zones in contrast with the prior art control strategy illustrated in FIG. 3 with only a single CD zone and a single CS zone.

Figure 5A:
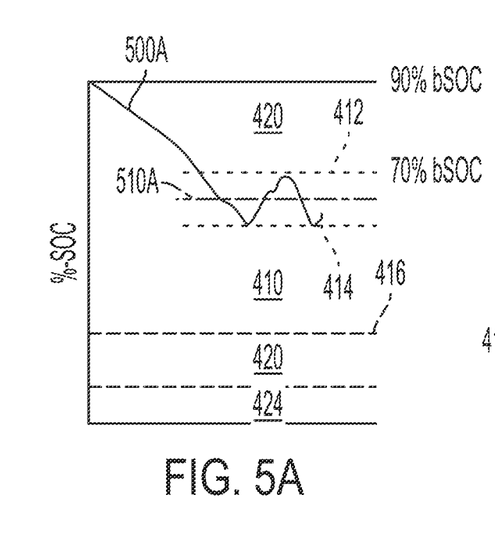
FIG. 5A illustrates operation of an electrified vehicle having a battery SOC above an associated battery health zone upper SOC threshold at the beginning of a trip.

FIG. 5A illustrates operation of an electrified vehicle having a battery SOC 500A above an associated battery health zone upper SOC threshold 412 at the beginning of a trip after detecting a trailer or similar high demand scenario. The control strategy operates the powertrain in charge depletion zone 420 until the SOC 500A crosses the health zone upper SOC threshold 412, and then operates in charge sustaining zone 410 with a target SOC 510A. In this region, the HV battery may still provide additional discharge power to the electric machine, which is beneficial during trailer tow operation (i.e. to provide better acceleration).

Figure 5B:
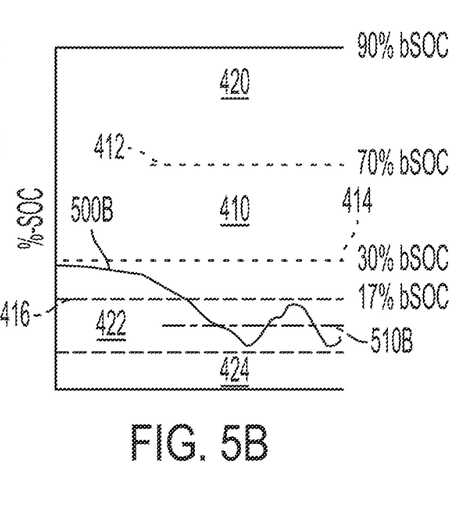
FIG. 5B illustrates operation of an electrified vehicle having a battery SOC between upper and lower SOC thresholds for an associated battery health zone at the beginning of a trip.

FIG. 5B illustrates operation of an electrified vehicle having a battery SOC 500B between upper health zone threshold 412 and lower health zone threshold 414 of an associated battery health zone at the beginning of a trip after detecting a trailer or similar high demand scenario. As illustrated, the SOC 500B starts within health zone 410. As such, the controller operates the powertrain in charge sustaining mode with a target SOC 510B. Again, in this region, the HV battery may still provide additional discharge power to the electric machine, which is beneficial during trailer tow operation (i.e. to provide better acceleration).

Figure 5C:
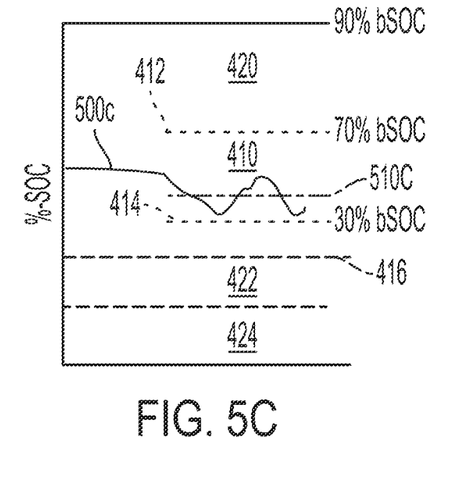
FIG. 5C illustrates operation of an electrified vehicle having a battery SOC below a lower SOC threshold of an associated health zone SOC at the beginning of a trip

FIG. 5C illustrates operation of an electrified vehicle having a battery SOC 500C below a lower health zone threshold 414 at the beginning of a trip after detecting a trailer or similar high demand scenario. The control strategy operates the powertrain in charge depletion zone 422 until the SOC 500C falls below threshold 416, and then operates the powertrain in charge sustaining zone 424 with a target SOC 510C to maintain the SOC above the SOC_LOW threshold. In this region little or no additional discharge power is available for the electric machine to provide better acceleration.

As shown in FIGS. 2, 4, and 5A-5C, electrified vehicle 112 includes one or more controllers 148, 180 programmed to, in response to detecting a trailer 110 connected to electrified vehicle 112, operate the electric machine(s) 114 and the engine 118 to sustain SOC of the traction battery 124 when the SOC is either between a first threshold 412 and a second threshold 414 or below a third threshold 416, and operate the electric machine(s) 114 and the engine 118 to deplete the SOC when the SOC is either above the first threshold 114 or between the second threshold 414 and the third threshold 416. Similarly, a method for controlling electrified vehicle 112 including traction battery 124 coupled to an electric machine 114 to selectively provide propulsive torque to the vehicle 112, and a secondary power source 118 configured to supply power to at least one of the electric machine 114 and the traction battery 124, includes, by a vehicle controller 148, 180: controlling the electric machine 114 and the secondary power source 118 to sustain a state of charge (SOC) of the traction battery 124 when the SOC is either below a first threshold 412 and above a second threshold 414 or below a third threshold 416 in response to detecting an operating condition associated with traction battery amp-hour throughput exceeding an associated throughput threshold. The method also includes controlling the electric machine 114 and the secondary power source 118 to deplete the SOC of the traction battery 124 when the SOC is above the third threshold 416, and to sustain the SOC when the SOC is below the third threshold 416 when the operating condition is not detected.

Figure 6:
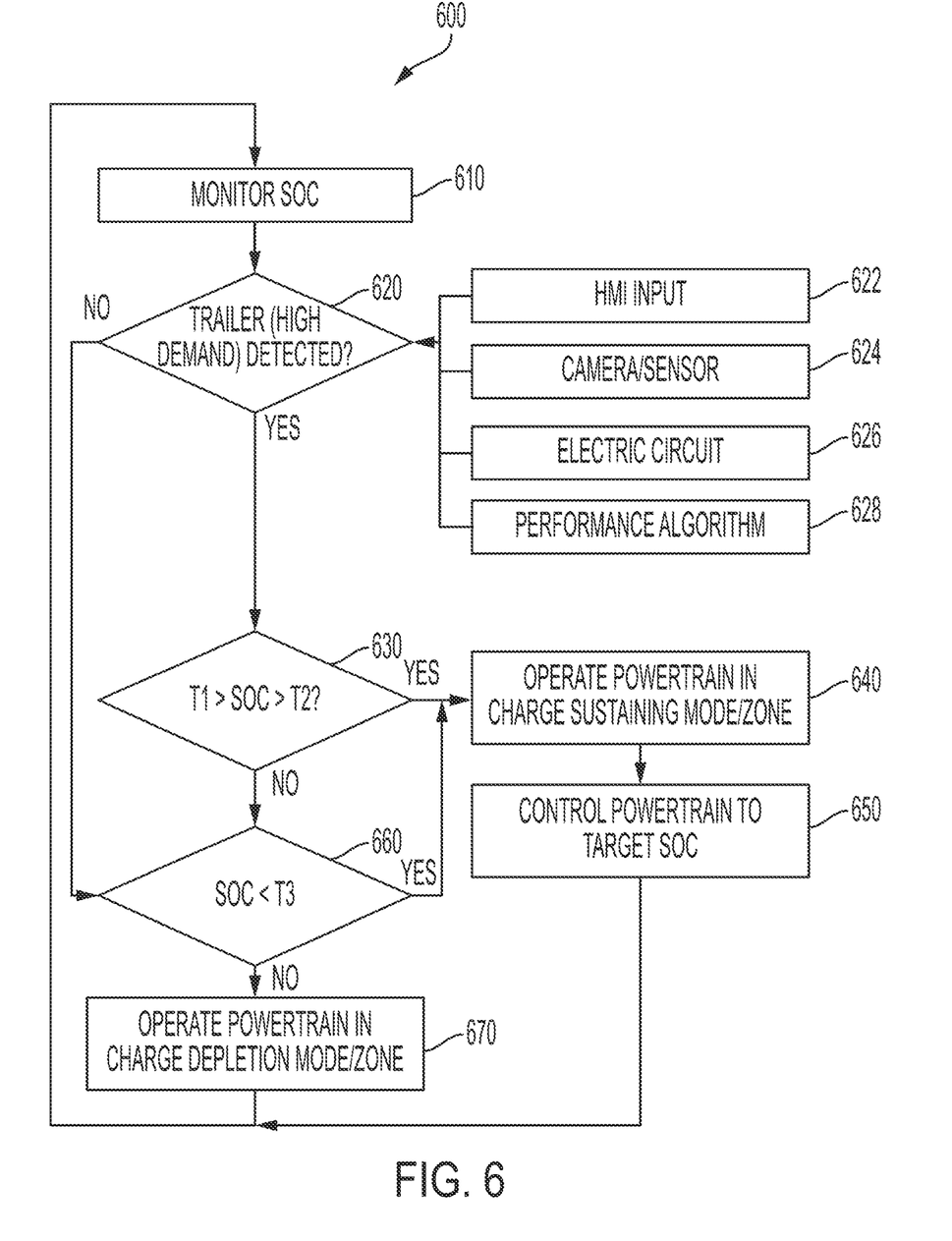
FIG. 6 is a graph illustrating operation of a system or method for controlling an electrified vehicle during trailer towing to maintain operation within a battery health zone.

FIG. 6 is a flowchart illustrating operation of a system or method 600 for controlling an electrified vehicle during trailer towing to maintain battery SOC within a battery health zone. HV battery SOC is monitored by one or more controllers 148, 180 as represented at 610. The controller detects whether a trailer is connected to the electrified vehicle (or conditions related to various other high demand use scenarios) as represented at 620. A trailer may be detected in response to a user entered input to select a tow/haul mode via an HMI as represented at 622. Alternatively, or in combination, a camera, radar, lidar, or other vehicle sensor may provide a signal indicative of a trailer being connected as represented at 624. Similarly, the controller may detect continuity or a load from an electric circuit connected to the trailer to power trailer lights, etc. as represented at 626. The controller may use one or more algorithms based on signals from various sensors to detect trailer towing or other significant increase in vehicle load as generally represented by performance algorithm 628.

If a trailer or other high demand use is detected at 620, then the controller determines whether the SOC is within the battery health zone defined by first threshold (T1) and second threshold (T2) at 630. If the SOC is within the health zone as determined at 630, the controller operates the powertrain to sustain the SOC as represented at 640. The controller may control the powertrain to a target SOC as represented at 650. As previously described, charge sustaining operation may use a secondary power source, such as an internal combustion engine, a second battery, a fuel cell, etc. to provide propulsive torque directly to the vehicle wheels, or may power the electric machine to provide propulsive torque. The secondary power source may also charge the battery to maintain the SOC within a specified control range of the target SOC. Regenerative braking may also be used with the electric machine operating as a generator to charge the traction battery. Similarly, the traction battery may be discharged to provide additional acceleration or to maintain the target SOC while operating in the charge sustaining zone.

If the SOC is not within the battery health zone as determined at 630, then the controller determines if the SOC is below a third threshold (T3) at 660. If yes at 660, the controller operates the powertrain to sustain the SOC as indicated at 640 and sets a target SOC at 650 as previously described. If no at 660, the controller operates the powertrain in a charge depletion zone or mode at 670 and continues to discharge the traction battery to power the electric machine to propel the vehicle.

If a trailer or other high demand use is not detected at 620, then the controller determines whether the SOC is below the third threshold (T3) at 660. If yes, the controller operates the powertrain to sustain the SOC at 640 based on a corresponding target SOC indicated at 650. If no at 660, the controller operates the powertrain in a charge depletion mode or zone at 670.

As previously described, existing strategies for electrified vehicle control typically provide a single charge depletion zone and a single charge sustaining zone. As such, high demand applications such as trailer towing with associated high Ah throughput may adversely impact battery SoH. In contrast, one or more embodiments of the disclosure as described above utilize a battery health zone to increase operation in charge sustaining mode and reduce high Ah throughput over the vehicle lifetime to reduce or eliminate the impact on battery SoH.

Use of the control strategy to increase operation of charge sustaining mode during trailer towing and similar high demand use scenarios may substantially improve battery life as demonstrated by an empirical analysis for a representative PHEV and summarized in the following table. The table illustrates Ah/mile over the vehicle life for a prior art baseline strategy with 20% trailer towing (TT) miles relative to the health zone strategy described herein:

|  | Baseline | Health Zone |
|---|---|---|
| Non-TT | 1.33 | 1.33 |
| TT | 2.19 | 0.96 |
| TT Usage | 20% | 20% |
| Composite | 1.50 | 1.26 |

In the table above, the composite baseline Ah/mile is 1.5 for a vehicle towing 20% of the miles. However, by implementing a battery health zone control strategy according to the disclosure, composite Ah throughput is reduced to 1.26 Ah/mile, which is a significant improvement of 16%. This improvement will increase even more for applications that have trailer towing or other high demand use scenarios as a larger portion of overall vehicle use, i.e. as high demand mileage increases over the 20% use case illustrated in the table.

While representative embodiments are described above, it is not intended that these embodiments describe all possible forms encompassed by the claims. The words used in the specification are words of description rather than limitation, and it is understood that various changes can be made without departing from the claimed subject matter. As previously described, the features of various embodiments can be combined to form further embodiments of the invention that may not be explicitly described or illustrated. While various embodiments may have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An electrified vehicle comprising:
a traction battery;
an electric machine powered by the traction battery to selectively provide propulsion to the vehicle;
an engine coupled to the electric machine; and
a controller programmed to, in response to detecting a trailer connected to the electrified vehicle, operate the electric machine and the engine to sustain a state of charge (SOC) of the traction battery when the SOC is between a first threshold and a second threshold and when the SOC is below a third threshold, and operate the electric machine and the engine to deplete the SOC when the SOC is above the first threshold and when the SOC is between the second threshold and the third threshold.

2. The electrified vehicle of claim 1 wherein the first threshold is higher than the second threshold and the second threshold is higher than the third threshold.

3. The electrified vehicle of claim 1 further comprising at least one sensor mounted on the vehicle and configured to provide a signal to the controller to detect the trailer.

4. The electrified vehicle of claim 3 wherein the at least one sensor comprises a camera.

5. The electrified vehicle of claim 1 wherein the controller is programmed to detect the trailer when a trailer electrical circuit configured to power trailer lights is connected to a corresponding electrical circuit of the electrified vehicle.

6. The electrified vehicle of claim 1 wherein the controller is programmed to detect the trailer by comparing a measured vehicle acceleration to an expected vehicle acceleration associated with a driver demand torque.

7. The electrified vehicle of claim 1 further comprising a human-machine interface (HMI), wherein the controller is programmed to detect the trailer in response to input received by the HMI and communicated to the controller.

8. The electrified vehicle of claim 1 wherein the first threshold corresponds to 70% SOC and the second threshold corresponds to 30% SOC.

9. A method for controlling an electrified vehicle having a traction battery coupled to an electric machine to selectively provide propulsive torque to the vehicle, and a secondary power source configured to supply power to at least one of the electric machine and the traction battery, the method comprising, by a vehicle controller:
in response to detecting an operating condition associated with traction battery amp-hour throughput exceeding an associated throughput threshold, controlling the electric machine and the secondary power source to sustain a state of charge (SOC) of the traction battery when the SOC is below a first threshold and above a second threshold, and when the SOC is below a third threshold; and
in response to not detecting the operating condition, controlling the electric machine and the secondary power source to deplete the SOC of the traction battery when the SOC is above the third threshold, and to sustain the SOC when the SOC is below the third threshold;
wherein the first threshold is higher than the second threshold and the second threshold is higher than the third threshold.

10. The method of claim 9 further comprising, by the vehicle controller:
in response to detecting the operating condition, controlling the electric machine and the secondary power source to deplete the SOC of the traction battery when the SOC is above the first threshold, and when the SOC is below the second threshold and above the third threshold.

11. The method of claim 10 wherein the secondary power source comprises an internal combustion engine.

12. The method of claim 11 wherein the operating condition comprises towing a trailer.

13. The method of claim 12 further comprising detecting the operating condition in response to receiving input from a human-machine interface (HMI) of the electrified vehicle.

14. The method of claim 12 further comprising detecting the operating condition in response to detection of completion of an electrical circuit between the trailer and the electrified vehicle.

15. The method of claim 12 further comprising detecting the operating condition based on comparing measured acceleration of the electrified vehicle for a specified torque request to an associated expected acceleration.

16. A system for an electrified vehicle having an electric machine powered by a traction battery and an engine, the system comprising:

a controller programmed to, in response to detecting an operating condition associated with traction battery amp-hour throughput exceeding an associated throughput threshold:
- sustain a state of charge (SOC) of the traction battery when the SOC is either: a) below a first threshold and above a second threshold; or b) below a third threshold; and
- deplete the SOC of the traction battery when the SOC is between the second and the third thresholds.

17. The system of claim 16 wherein the controller is further programmed to detect the operating condition in response to detecting a trailer coupled to the electrified vehicle.

18. The system of claim 17, wherein the controller is further programmed to, in response to not detecting the operating condition:
- deplete the SOC when the SOC is above the third threshold; and
- sustain the SOC when the SOC is below the third threshold.

19. The system of claim 18 wherein the controller is further programmed to detect the operating condition based on input from a human-machine interface of the electrified vehicle.

20. The system of claim 19 wherein the controller is further programmed to detect the operating condition based on an electrical connection between the trailer and the electrified vehicle.

* * * * *